Aug. 12, 1947.  J. W. RUTLEDGE  2,425,644
TRACTION CHAIN
Filed May 5, 1944

J. W. Rutledge
INVENTOR.

BY
ATTORNEYS.

Patented Aug. 12, 1947

2,425,644

UNITED STATES PATENT OFFICE 2,425,644

TRACTION CHAIN

John W. Rutledge, El Paso, Tex.

Application May 5, 1944, Serial No. 534,317

1 Claim. (Cl. 152—179)

This invention aims to provide a novel tread band for the tires of vehicle wheels comprising a plurality of blocks, novel means being provided for reinforcing the blocks, for pivotally assembling one block with a like block, and for adjusting each block to fit on the tire wherewith the device is used, a broadened tread being afforded, and the device enabling the vehicle to be used upon surfaces which are either soft or rough and obstructed.

Within the scope of what is claimed, the structure described and shown may be changed, without departing from the spirit of the invention.

In the drawing:

Fig. 1. shows in side elevation, a device constructed in accordance with the invention, mounted on a vehicle tire;

Figure 1:
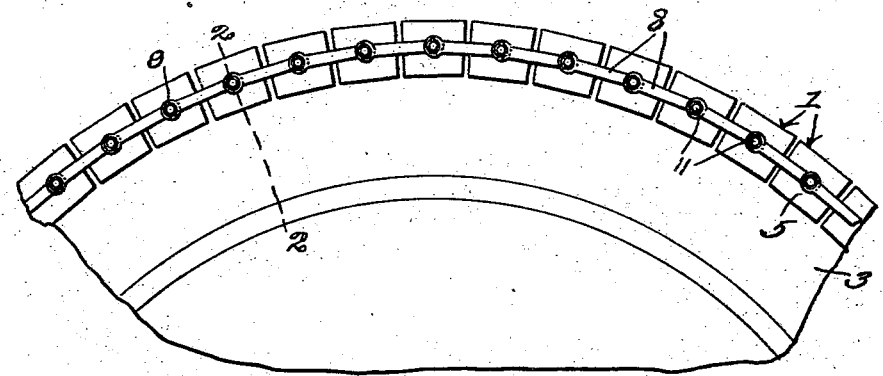
Figure 2:
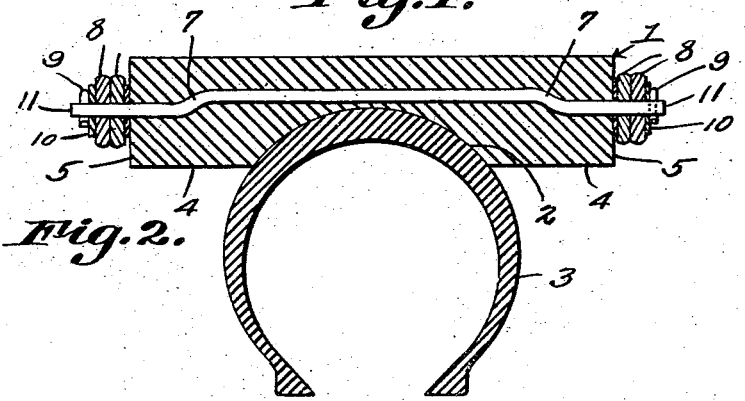
Fig. 2 is a section on the line 2—2 of Fig. 1.
Figure 3:
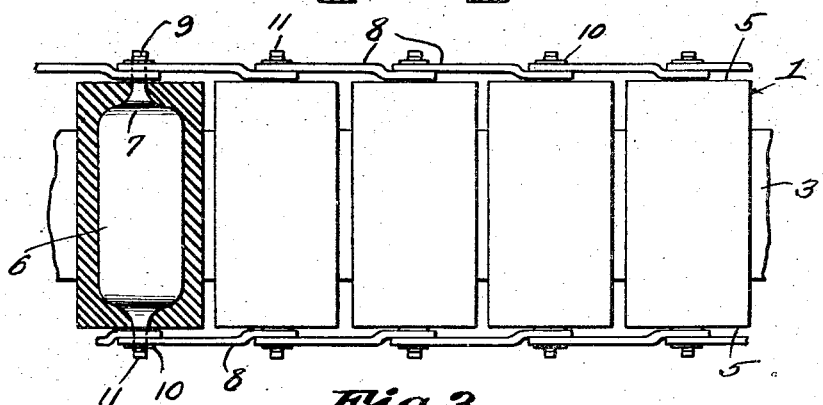
Fig. 3 is a top plan wherein parts are broken away.

The tread band forming the subject matter of this application comprises a plurality of blocks, which, preferably, are made of molded rubber, a rubber substitute, fiber or the like. The blocks 1 preferably are of greater length than width and are of rectangular cross section both longitudinally and transversely. The length of the blocks 1 is greater than the greatest diameter of the tire whereon the device is used, so that the blocks project laterally beyond the tire and afford an adequate tread.

Each block is provided in its inner surface with a seat 2, which is shaped to fit closely on the tread portion of the tire wherewith the band is used, the tire being marked by the numeral 3. The seat 2 is spaced, as shown at 4, from the ends 5 of the block 1.

A reinforcement for each block 1 is provided, and comprises a plate-like body 6, completely enclosed in the block 1, and reduced spindles 11 at the ends of the body, the spindles projecting out of the block at its ends 5. The reinforcement preferably is made of rigid metal. These spindles are extended from the centers of the ends of the block.

In the interest of adequate reinforcement, the area of the body 6 approximates closely the tread area of the block 1. The body 6 is outwardly offset, as shown at 7, at the places of juncture between the body and the spindles 11.

Owing to the provision of the offsetting shown at 7, it is possible to form the seat 2 in the block 1. Moreover, the body 6 is disposed closer to the tread surface of the block 1 than to the inner surface of the block, and the body is so located that it will give reinforcement where reinforcement most is needed, to wit, adjacent to the outer surface of the block 1. The offsetting shown at 7 also disposes the spindles 11 midway between the tread and inner surface of the block 1, and the spindles, therefore, are reinforced by the block.

The blocks 1 are joined together, to form the tread band, through the instrumentality of links 8, pivotally assembled with the spindles 11 of adjoining blocks, the links being held on the spindles by cotter pins 9 and washers 10, or by any other appropriate means. As the spindles are extended from the centers of the ends of the block and are there engaged by the links which thus form a chain extending across the ends of the blocks, the blocks are held constantly properly centered between the two chains so that strains are transmitted directly from the chain links to the axial centers of the blocks and danger of distortion while in use is thus reduced to the minimum.

The device is simple in construction, but it affords an adequate tread surface, as well as reducing the wear and tear on a tire.

I claim:

In a traction chain for the treads of pneumatic tires, laterally spaced chains each comprising pivotally connected links, said chains being spaced apart a distance greater than the over-all diameter of the tire to which the structure is to be applied, spindles the ends of which constitute the pivotal connections between the links, said spindles being arranged in pairs and the spindles of each pair being joined by a plate integral therewith, and blocks having flat longitudinal faces and rectangular ends, each of said blocks constituting a housing for one of the plates and portions of the spindles extending therefrom, said blockes being extended up to the respective chains, the spindles being centered in the angular ends of the blocks and each of said blocks having a recess proportioned to receive and provide a seat for the tread portion of a tire.

JOHN W. RUTLEDGE.

REFERENCES CITED

The following references are of record in the file of this patent:

UNITED STATES PATENTS

| Number | Name | Date |
|---|---|---|
| 1,275,633 | Waite | Aug. 13, 1918 |
| 881,768 | Bradley | Mar. 10, 1908 |
| 1,375,584 | Gero | Apr. 19, 1921 |
| 1,407,529 | Greenfield | Feb. 21, 1922 |
| 2,330,839 | O'Brien | Oct. 15, 1943 |
| 1,568,581 | Albert | Jan. 5, 1926 |
| 2,310,467 | Schwab | Feb. 9, 1943 |
| 1,269,398 | Daniel | June 11, 1918 |

FOREIGN PATENTS

| Number | Country | Date |
|---|---|---|
| 68,590 | Switzerland | 1915 |